July 30, 1935.
A. E. FITZGERALD
2,009,653
BLOWER BEARING
Filed Dec. 12, 1932
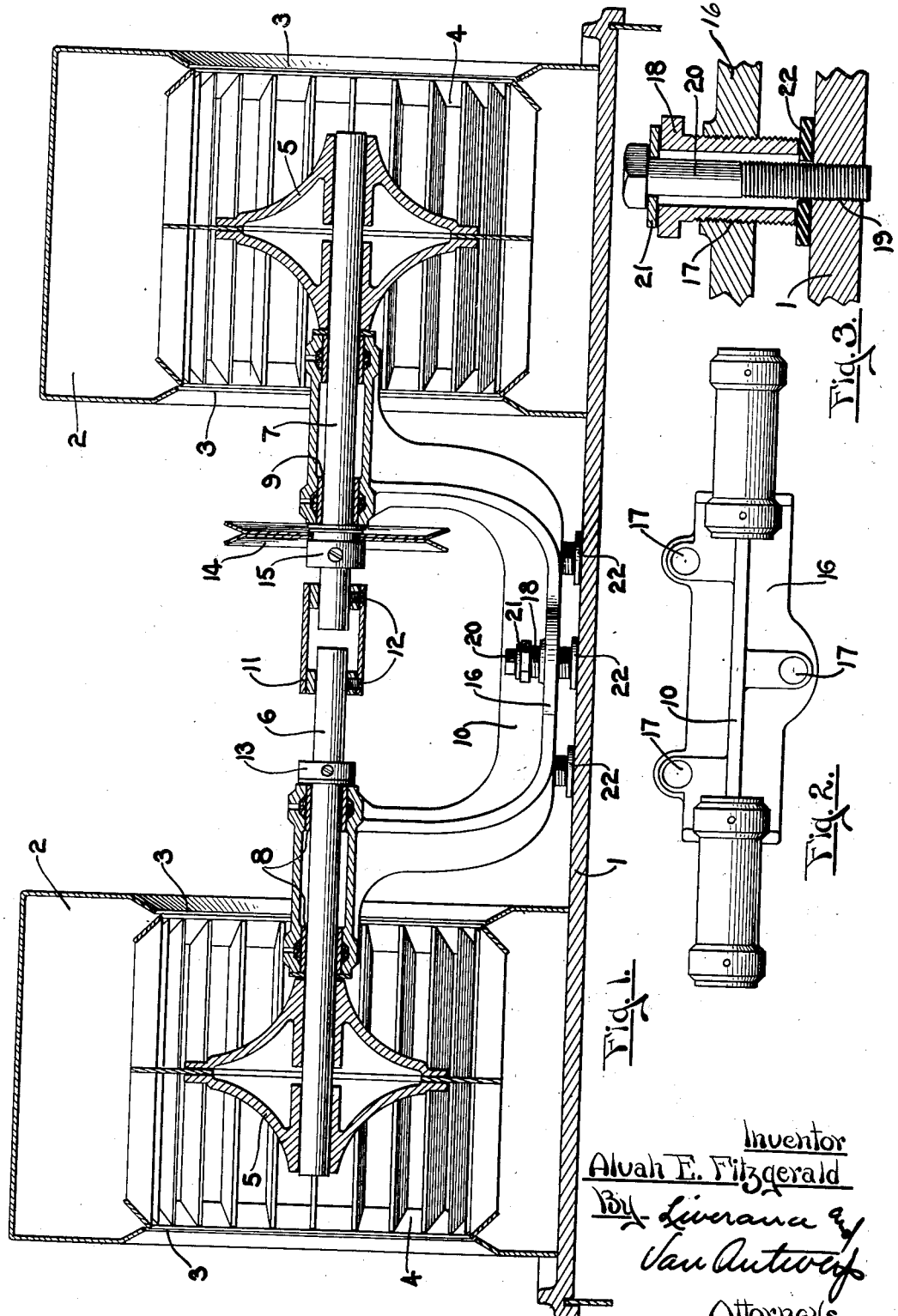
Inventor
Alvah E. Fitzgerald
By Liverance &
Van Antwerp
Attorneys Patented July 30, 1935

2,009,653

UNITED STATES PATENT OFFICE 2,009,653

BLOWER BEARING

Alvah E. Fitzgerald, Holland, Mich., assignor to Holland Furnace Company, Holland, Mich., a corporation of Michigan Application December 12, 1932, Serial No. 646,774

2 Claims. (Cl. 308—60)

This invention relates to an adjustable bearing and more particularly an adjustable bearing mounting for fan or blower rotors.

The invention particularly pertains to a device comprising two spaced apart blowers, each having a rotor and two alined shafts on which the respective rotors are mounted. The shafts are journaled in a unitary member having bearings for the respective shafts and the unitary bearing member is mounted upon a base by means which provide a convenient, accessible and universal adjustment of the bearing member whereby the rotors may be properly located in their respective blower casings. The invention also provides means for conveniently removing and replacing the endless belt which passes over a pulley on one of the blower shafts by which the shafts are driven. The invention provides various other novel features of construction and arrangement as hereinafter more fully described and particularly pointed out in the claims, reference being had to the accompanying drawing in which, Fig. 1 is a sectional elevation of a device embodying this invention.

Fig. 2 is a plan view of the bearing member and,

Fig. 3 is an enlarged fragmentary sectional elevation of one of the adjustable supporting and fastening means by which the bearing member is secured to its support.

Like reference numbers refer to like parts in all of the figures.

1 represents a support on which the various members of the device are mounted. 2 are the blower housings each having inlet openings 3 at respective opposite vertical sides. The blowers herein shown are of the centrifugal type and are each provided with rotors 4 of the squirrel cage type. Each of the rotors 4 has a hub 5 which is mounted respectively on shafts 6 and 7. The shafts 6 and 7 are respectively provided with journal bearings 8 and 9 which hold the shafts in alinement and the journal bearings 8 and 9 are formed on respective bifurcations of a yoke shaped bearing member 10.

The shafts 6 and 7 have their adjacent ends spaced apart for the purpose hereafter described and are joined by a suitable flexible coupling 11 which coupling is preferably attached to the respective shafts by set screws 12. The shafts are held against longitudinal movements in their bearings by the hubs 5 of the rotors in engagement with the ends of the bearings, and the shaft 6 is provided with a collar 13 in engagement with the opposite end of the bearing 8 while the shaft 9 is provided with a pulley 14, the hub 15 of which engages one end of the bearing 9.

An endless belt (not shown) passes around the pulley 14 and around a driving pulley such as the pulley on a motor shaft in a conventional manner to drive the shafts and fan rotors and, as is well known, the driving belt must occasionally be removed because of wear and be replaced with another one. For this purpose the coupling 11 must be unclamped from the respective shafts by loosening the set screws 12 and slid longitudinally onto the shaft 6 disclosing the space between the two shafts which is sufficient to pass the endless belt so that it can be completely removed and a new one inserted between the ends of the shafts and placed over the pulley after which the coupling 11 is moved back to its normal position and clamped to both shafts by the set screws 12.

In this particular device it is essential to have the blowers 4 accurately located within their housings and to provide this accurate adjustment the unitary bearing member 10 is fastened for universal adjustment on the support 1. The member 10 has a base 16 which is provided with three threaded openings 17 arranged relative to each other as at the respective angles of a triangle. A threaded bearing bushing 18 is screwed into each threaded opening 17 and is long enough to extend completely through the base 16, each bushing 18 having an axial opening. The support 1 is provided with three screw threaded openings 19 located to correspond with the openings 17 in the base 16 and a screw 20 is provided for each of the threaded openings 19 which screws are appreciably smaller in diameter than the diameter of the opening through each bushing 18. A washer 21 surrounds each bolt 20 and is interposed between the upper end of the bushing 18 and the head of the bolt or if preferred the head of the bolt may be of sufficient diameter to obviate the necessity of the washer 21. A rubber cushion gasket 22 is interposed between the lower end of each bushing and the support 1 to absorb vibration and make the device operate more quietly.

In the structure above described the bushings 18 project through the base 16 of the bearing member and serve as feet upon which the base is supported providing a three point mounting. Each of the bushings 18 or "feet" is adjustable as to height by turning it in the threaded opening 17. The openings in the bushings 18, being larger than the bolts 20, also permits the bearing member 10 to be adjusted horizontally upon the support 1. By means of these various adjustments the rotors 4 may be accurately positioned in their respective casings. The bearing member 10 may be moved in a plane parallel with the support 1 by reason of the space surrounding the screws 20 in the bushings 18 and the bearing member may be raised or lowered or tipped by screwing the bushings 18 one way or another in the base 16. After proper adjustment has been attained the screws 20 are tightened so that their heads will engage the washers 21 and hold the bushings 18 firmly against the cushion members 22 upon the base 1.

This means of mounting the shafts 6 and 7 centralizes the attachment to the support, which arrangement prevents misalinement of the bearings 8 and 9 by warping of the support 1 since the support will not appreciably warp in the area over which the attaching screws 20 are distributed.

Having thus revealed this invention, I claim as new and desire to secure the following combinations, or equivalents thereof, by Letters Patent of the United States:

1. In a device of the class described, the combination of, a unitary shaft bearing, closely grouped individually adjustable means for attaching said shaft bearing to a support, said supporting means comprising three triangularly located bushings screw threaded in said bearing, each bushing having an axial opening and a screw extending through each of said bushings and having a portion engaging the bushing and being screw threaded into said support.

2. In a device of the class described, the combination of, a unitary shaft bearing, closely grouped individually adjustable means for attaching said shaft bearing to a support, said supporting means comprising a plurality of bushings screw threaded into said bearing and engageable with said support, each bushing having an axial opening, and a screw smaller than said axial opening and extending through each bushing, said screw being engageable with the bushing and being screw threaded into said support.

ALVAH E. FITZGERALD.